United States Patent
Sehrawat et al.

(10) Patent No.: US 11,316,673 B2
(45) Date of Patent: Apr. 26, 2022

(54) PRIVACY PRESERVING SECRET SHARING FROM NOVEL COMBINATORIAL OBJECTS

(71) Applicant: Seagate Technology LLC, Fremont, CA (US)

(72) Inventors: Vipin Singh Sehrawat, Shugart (SG); Foo Yee Yeo, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/018,899

(22) Filed: Sep. 11, 2020

(65) Prior Publication Data

US 2022/0085978 A1    Mar. 17, 2022

(51) Int. Cl.
*H04L 29/06* (2006.01)
*H04L 9/08* (2006.01)
*H04L 9/30* (2006.01)
*H04L 9/32* (2006.01)

(52) U.S. Cl.
CPC ............. *H04L 9/085* (2013.01); *H04L 9/088* (2013.01); *H04L 9/3026* (2013.01); *H04L 9/3218* (2013.01)

(58) Field of Classification Search
CPC ..... H04L 9/085; H04L 9/3218; H04L 9/3026; H04L 9/088
See application file for complete search history.

(56) References Cited

U.S. PATENT DOCUMENTS

| | | | |
|---|---|---|---|
| 5,764,767 A * | 6/1998 | Beimel | H04L 9/085 380/286 |
| 7,389,416 B2 | 6/2008 | Cachin et al. | |
| 8,549,290 B2 | 10/2013 | Nishimaki et al. | |
| 8,995,660 B2 | 3/2015 | Kobayashi et al. | |
| 9,077,539 B2 | 7/2015 | Kamara et al. | |
| 9,331,984 B2 | 5/2016 | Matsuo | |
| 10,728,038 B2 * | 7/2020 | Tomlinson | H04L 63/0442 |

(Continued)

FOREIGN PATENT DOCUMENTS

| | | | | |
|---|---|---|---|---|
| WO | WO-9925090 A1 * | 5/1999 | | G09C 5/00 |
| WO | WO-2015016828 A1 * | 2/2015 | | G06F 21/6209 |

OTHER PUBLICATIONS

Huhns et al., "Service-oriented computing: key concepts and principles", IEEE Internet Computing, vol. 9, Issue: 1, Jan.-Feb. (Year: 2005).*

(Continued)

*Primary Examiner* — Morshed Mehedi
(74) *Attorney, Agent, or Firm* — Holzer Patel Drennan

(57) ABSTRACT

A secret sharing scheme in which a trust structure of the parties receiving a share of the secret is encoded in the shares. In this regard, an access structure defining an authorized set of participants may be based, at least in part, on the encoded trust structures. The secret sharing scheme includes a secret generator that generates the shares distributed to the parties. In turn, an authorized set of participants as defined by the access structure may provide shares to a dealer for reconstruction of the secret. However, if the participants requesting secret reconstruction are not an authorized set of participants, the secret reconstruction fails. In this regard, secret sharing with asymmetrical trust structures may be provided in which the trust structures are not known by other parties in the scheme.

20 Claims, 5 Drawing Sheets

(56) References Cited

U.S. PATENT DOCUMENTS

| | | | |
|---|---|---|---|
| 2010/0215172 A1* | 8/2010 | Schneider | H04L 9/085 380/28 |
| 2012/0002811 A1 | 1/2012 | Smart | |
| 2018/0097624 A1 | 4/2018 | Bellare et al. | |
| 2018/0373834 A1* | 12/2018 | Cho | G16B 30/00 |

OTHER PUBLICATIONS

Damgard, Ivan et al. "Secure Protocols with Asymmetric Trust"—Asiacrypt 2007, pp. 357-375.
Zhi, D.L. et al. "A Hybrid Quantum Secret Sharing Scheme based on Mutually Unbiased Bases"—Shaanxi Normal University, Shaanxi China, Jun. 23, 2020.
Eriguchi, Reo et al. "d-Multiplicative Secret Sharing for Multipartite Adversary Structures"—1st Conference on Information-Theoretic Cryptography (ITC 2020).
Shamir, Adi, "How to Share a Secret", Communications of the ACM 22 (1979), pp. 612-613.
Blakley, G.R., "Safeguarding cryptographic keys", American Federation of Information Processing. vol. 48. 1979, pp. 313-317.
Harn, L. et al, "Asynchronous Secret Reconstruction and Its Application to the Threshold Cryptography", Int. J. Communications, Network and System Sciences, 2014, 7, 22-29.
Cho et al, "Secure genome-wide association analysis using multiparty computation", Nature Biotechnology May 2018, pp. 547-553.

* cited by examiner

PRIVACY PRESERVING SECRET SHARING FROM NOVEL COMBINATORIAL OBJECTS

SUMMARY

The present disclosure relates to a secret sharing scheme in which trust structures (e.g., asymmetric trust structures) are encoded into shares of the secret such that information regarding the trust structure of a given party is used to determine an authorized subset of participants for reconstruction of a secret without the other parties having any information regarding the trust structure. The secret is shared amongst a plurality of computing devices by distributing a share of the secret to a plurality of computing devices. As noted above, the secret is not reconstructable with less than the shares of an authorized subset of participants that comprises a subset of the plurality of computing devices. A request to reconstruct the secret may include the shares from a participating subset of the computing devices. Each of the shares from the participating subset of the computing devices comprise an encoded trust structure for the corresponding computing device. In turn, the authorized subset of participants required to participate in the request for reconstruction of the secret may be defined. The authorized subset of participants is based on the encoded trust structures of the shares of the participating subset of the computing devices. It may be determined whether the participating subset of computing devices comprises the authorized subset of participants and reconstructing the secret using the plurality of shares when the participating subset of the computing devices comprises the authorized subset of participants.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTIONS

Figure 1:
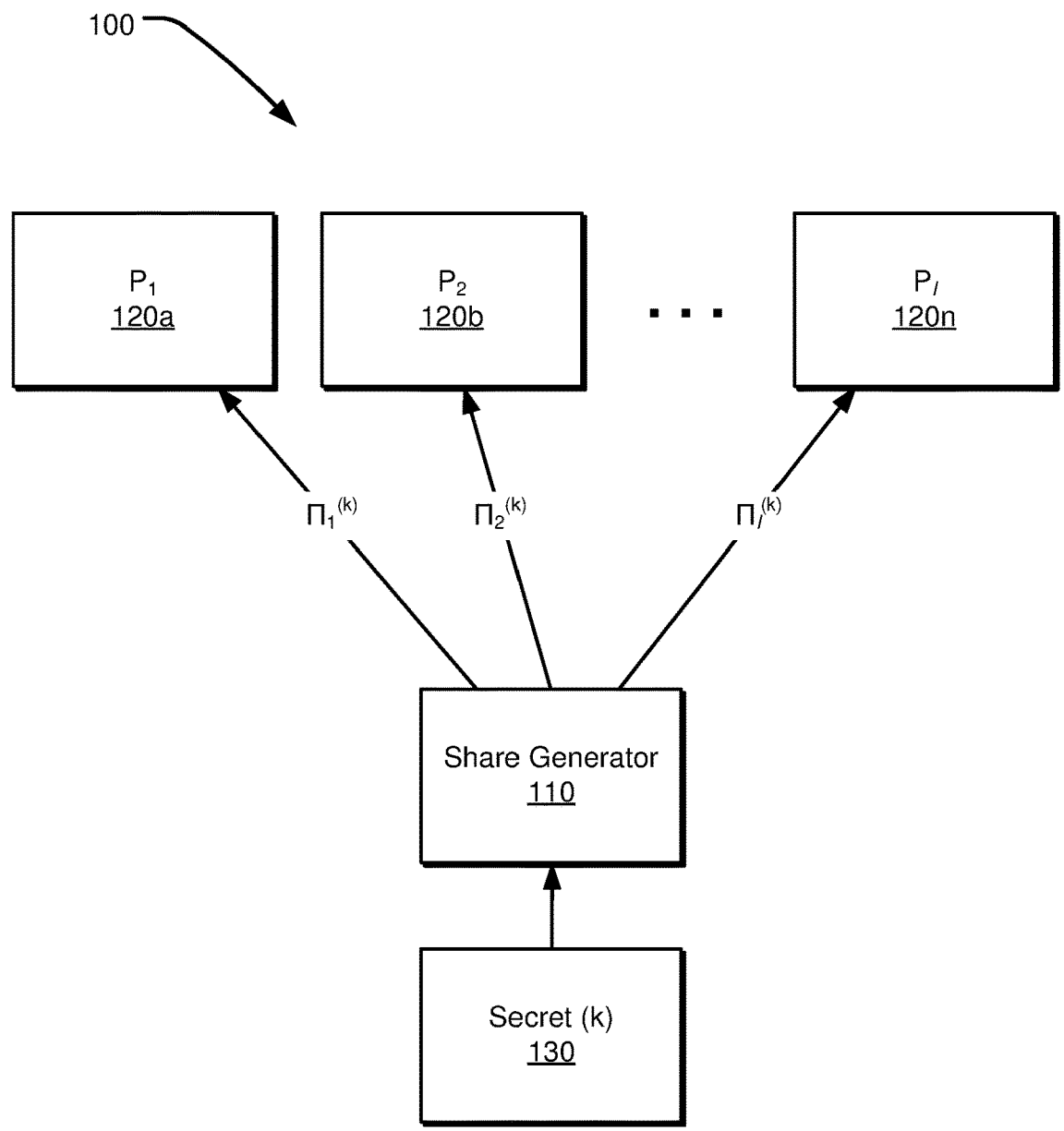
FIG. 1 illustrates an example of a secret sharing scheme in which shares of a secret are distributed to parties, wherein the shares have encoded therein information regarding to an access structure for the scheme.

Secret sharing provides a means to distribute shares of a secret so that any authorized subset of participants may reconstruct the secret. In the field of computer science, such a secret may comprise data in a memory device of a computing system comprising one or more computing devices. Shares of the secret (which may alternatively be referred to as share data) may be created. The shares of the secret may correspond to share data that can be provided to a plurality of computing devices. In turn, when shares are received from any authorized subset of participants, the shares may be used to recompute the secret (i.e., recreate the original data of the secret at a computing device). In trivial secret sharing, it may be that all of the computing devices to which share data has been provided must participate in reconstruction of the secret. This, however, is not optimal as certain parties may be compromised or lose the share data. In this scenario, the secret may not be capable of being reconstructed and the secret data lost.

Accordingly, in one example of a secret sharing scheme, a threshold is established corresponding to a given number of participants who must participate in a request to reconstruct the secret to successfully achieve secret reconstruction. In such a scheme, a total number of parties (n) are provided shares such that a threshold (t) number of parties must be participants in secret reconstruction to be successful. This is often referred to as the threshold case or a (t, n)-threshold scheme. In the traditional (t, n)-threshold scheme, the authorized subset of participates required to reconstruct the secret is defined by a publicly known access structure. That is, all participants know that so long as a threshold (t) or greater number of participants provide shares, the secret can be reconstructed.

However, certain scenarios may exist where multiple parties wish to perform secret sharing, but the parties to which a share has been provided do not trust each other completely. A multitude of such scenarios can be contemplated including, for example, potentially adverse business parties, potentially adverse government actors, or any other situation in which distrust between parties may exist. In relation to such a scenario, a solution to address this issue has been proposed that implements an asymmetric trust model. In such an asymmetrical trust model, each party to which a share has been provided is allowed to specify a trust structure. In the trust structure, each party declares which of the other parties having shares that it trusts. Such trust structures may be used to define one or more authorized subsets which specify the parties that are trusted by all or at least a majority of the other parties, and adversary subsets which specify the parties that are not trusted by all or at least a majority of the other parties.

In any regard, once each party having a share declares its trust structure, the protocol (applied by an entity sometimes referred to as a "dealer," which may or may not itself be a party having a share) uses the trust structures declared by each party to generate the authorized subset of participants required to successfully reconstruct the secret using the shares of the authorized subset of participants.

However, prior solutions proposed for asymmetrical trust models require the trust structure of each party to be public. As can be readily understood, it is highly undesirable in practical settings for the trust structure of each party to be known by the other parties in the secret sharing scheme. For instance, heightened animosity, fear of retaliation, souring of relationships, or other adverse outcomes may occur when trust structures are publicly known. In fact, the problem of mandating public trust structures is common among all secret sharing schemes, irrespective of whether a secret sharing scheme supports threshold or general access structures.

Accordingly, the present disclosure introduces secret trust structures. In the approach detailed herein, the authorized subset that is derived from trust structures of all parties that remains secret prior to secret reconstruction. As such, this allows parties having a share of a secret to define a trust structure in accord with the party's perceived trustworthiness of the other parties without the other parties being aware of any information related to such trust structures. In turn, the authorized subset of participants required to participate to successfully reconstitute a secret may be based on the secret trust structures of each party participating in the protocol.

In order to realize secret sharing with secret trust structures, the presently disclosed approach utilizes combinatorial objects. The combinatorial object is a mathematical structure that can be used to enhance the privacy guarantees of most distributed security protocols. In the approach described herein, combinatorial objects are constructed that succinctly "encode" a trust structure. In turn, the encoded trust structure of each party provides no information regarding the trust structure of a given party prior to secret reconstruction. That is, none of the parties are able to determine any information regarding the trust structure of others of the parties, even if the party is in possession of the encoded trust structure of another party. Decoding the encoded trust structure requires all the parties in an authorized subset to collaborate. The authorized set may be based on the encoded trust structures of the participants in a secret reconstruction. Thus, if the participants participating in the reconstitution are not an authorized set based on the encoded trust structures of each party, reconstruction of the secret fails and none of the parties will have information regarding the other parties' encoded trust structures.

The approaches described herein may utilize applications of Extremal set theory, which provides how small or large a collection of sets can satisfy certain restrictions. The restrictions may relate to security parameters regarding the parties that participate in a secret sharing protocol. An example of the encoding mechanism described herein allows representing $2^n$ authorized and unauthorized subsets, corresponding to a trust structure, by a single vector inner product. In this regard, the total number of all possible such sets is $2^{2^{n-O(\log n)}}$.

The benefits of the solution described herein include that the scheme identifies a fundamental privacy violating flaw in the previous secret sharing models. The presently described scheme also enhances privacy in secret sharing by introducing the concept of secret access structures. Also, the present scheme allows competitors to collaborate in a manner that enforces the trust structures of each party without revealing the mistrust among the parties. Moreover, the present scheme introduces novel combinatorial objects with multiple applications in distributed security.

In view of the foregoing, the following discussion relates to mathematical concepts that facilitate the secret access structures having the properties described above. Specifically, a system may have a plurality of parties defined as $\mathcal{P}=\{P_1, \ldots, P_\ell\}$. An access structure is defined as $\Gamma \subseteq 2^{\mathcal{P}}$, which is a monotone collection of non-empty subsets of the set of parties ($\mathcal{P}$). A collection $\Gamma \subseteq \mathcal{A}$ is monotone if $2^{\mathcal{P}} \in \Gamma$ and $\mathcal{A} \subseteq \mathcal{B}$ imply that $\mathcal{B} \in \Gamma$. Sets in $\Gamma$ are called authorized and sets not in $\Gamma$ are called not authorized. If $\Gamma$ consists of all subsets of $\mathcal{P}$ with size greater than or equal to a fixed threshold t ($1 \le t \le \ell$), then $\Gamma$ is called a t-threshold access structure. For an access structure $\Gamma$, a family of minimal authorized subsets $\Gamma_0 \in \Gamma$ is defined as:

$\Gamma_0 = \{ \mathcal{A} \in \Gamma : \mathcal{B}$ is not a subsetsbust of $\mathcal{A}$ for all $\mathcal{B} \in \Gamma \setminus \{\mathcal{A}\}\}$ A computational secret sharing scheme may comprise of a pair of polynomial-time algorithms that are provided with respect to an access structure ($\Gamma$), a security parameter ($\omega$), a set of $\ell$ polynomial-time parties $\mathcal{P}=\{P_1, \ldots, P_\ell\}$, and a set of secrets ($\mathcal{K}$). Polynomial-time algorithms are utilized in contrast to exponential algorithms to provide computational efficiency to the secret sharing scheme. In this regard, the secret sharing scheme may be conditionally secure against classical and quantum computing resources.

The polynomial-time algorithms may include a share generation algorithm and a secret reconstruction algorithm. The share generation algorithm is a randomized algorithm that gets a secret that is an element of the secret set ($k \in \mathcal{K}$) and access structure F as inputs and outputs a share for each of the parties. That is, the share generation algorithm outputs a number of shares equal to the number of parties. The shares may be defined as $(\{\Pi_1^{(k)}, \ldots \Pi_1^{(k)}\})$. In turn, each share can be provided to a party in the secret sharing scheme such that the access structure is encoded in the share by the share generation algorithm.

The secret reconstruction algorithm is a deterministic algorithm that gets as inputs the shares of a participating subset of the parties and outputs a string in the secret set. That is, the participating subset may be defined as $\mathcal{A} \subseteq \mathcal{P}$ denoted by $$\{\prod_i^{(k)}\}_{i \in \mathcal{A}}.$$

In relation to the share generation algorithm and the secret reconstruction algorithm, the algorithms may provide perfect correctness and computational secrecy. In relation to perfect correctness, for all secrets that are an element of the secret set and every authorized subset in the access structure, the output of the secret reconstruction algorithm is the secret (for all $k \in \mathcal{K}$ and every authorized subset $\mathcal{A} \in \Gamma$, it holds that $$Pr\left[Recon\left(\{\prod_i^{(k)}\}_{i \in \mathcal{A}}, \mathcal{A}\right) = k\right] = 1.$$

In relation to computational secrecy, for each subset that is not authorized and for any different secrets from the secret set, the distributions of the shares for parties from the unauthorized set are computationally indistinguishable (for every subset $\mathcal{B} \notin \Gamma$ and all different secrets $k_1, k_2 \in \mathcal{K}$, it holds that the distributions $$\{\prod_i^{(k_1)}\}_{i \in \mathcal{B}} \text{ and } \{\prod_i^{(k_2)}\}_{i \in \mathcal{B}}$$

are computationally indistinguishable with respect to $\omega$). If $\forall k_1, k_2 \in \mathcal{K}$ with $k_1 \ne k_2$, the distributions $$\{\prod_i^{(k_1)}\}_{i \in \mathcal{B}} \text{ and } \{\prod_i^{(k_2)}\}_{i \in \mathcal{B}}$$

are identical, then the scheme is called a perfect sharing scheme.

The present invention generally utilizes Extremal Set Theory to construct set systems under certain intersection restrictions and bounding their size. In relation to utilization of such Extremal Set Theory, in one example, it is provided that $m=\Pi_{i=1}^{r} p_i^{\alpha_i}$ is a positive integer with $r>1$ different prime divisors. Then there exists an explicitly constructible polynomial Q with n variables and degree $O(n^{1/r})$, which is equal to 0 on $z=(1, 1, \ldots, 1) \in \{0,1\}^n$ but is nonzero mod m on all other $z \in \{0,1\}^n$. Furthermore, $\forall z \in \{0,1\}^n$ and $\forall i \in \{1, \ldots, r\}$, it holds that: $Q(z) \in \{0,1\} \mod p_i^{\alpha_i}$.

In addition, let m be a positive integer, and suppose that m has $r>1$ different prime divisors:

$$m = \prod_{i=1}^{r} p_i^{\alpha_i}.$$

Then there exists $c=c(m)>0$, such that for every integer $h>0$, there exists an explicitly constructible uniform set-system $\mathcal{H}$ over a universe of h elements such that:

1. $|\mathcal{H}| \geq \exp\left(c \frac{(\log h)^r}{(\log\log h)^{r-1}}\right)$ 2. $\forall H \in \mathcal{H} : |H|=0 \mod m$, 3. $\forall G, H \in \mathcal{H}, G \neq H: |G \cap H| \neq 0 \mod m$.

Matching vector (MV) families follow from the foregoing definition in which $m=\Pi_{i=1}^{r} p_i^{\alpha_i}$ is a positive integer with $r>1$ different prime divisors and are used in cryptography in the context of private information retrieval, conditional disclosure of secrets, and secret sharing.

In addition, let m be a positive integer with $r>1$ different prime divisors: $m=\Pi_{i=1}^{r} p_i^{\alpha_i}$, and $S \subseteq \mathbb{Z}_m \setminus \{0\}$. The family of vectors $\{u_i\}_{i=1}^{n}$, $u_i \in (\mathbb{Z}_m)^h$ is said to be S-matching if the following conditions hold:
1. $\langle u_i, u_i \rangle = 0$ for every $i \in [n]$.
2. $\langle u_i, u_j \rangle \in S$ for every $i \neq j$.

where $\langle \cdot \rangle$ denotes the inner product, and $h>0$ is an integer.

The following result has been proven about the existence of MV families, modulo a non-prime power m. For positive integers h, r and $m=\Pi_{i=1}^{r} p_i^{\alpha}$, there exists a set S, such that $|S|=2^r-1$, and a family of S-matching vectors $\{u_i\}_{i=1}^{n}$, where $u_i \in (\mathbb{Z}_m)^h$, such that $$n \geq \exp\left(c \frac{(\log h)^r}{\log\log^{r-1} h}\right).$$

Hence, MV families exist for values of h that are significantly smaller than n.

The secret sharing scheme described herein may also leverage discrete Gaussian sampling as will now be described. For any center $c \in \mathbb{R}$, and Gaussian parameter $s \in \mathbb{R}^+$, the discrete Gaussian distribution may be defined as:

$$D_{s,c} = \frac{\rho_{s,c}(x)}{\sum_{y=-\infty}^{\infty} \rho_{s,c}(y)},$$

$\forall x \in \mathbb{Z}$, where $\rho_{s,c}(x)=e^{-\pi|x-c|^2/s^2}$ is the Gaussian function. The parameters of discrete Gaussians are governed by the security proofs of the particular cryptosystem. A finite machine cannot sample from a discrete Gaussian distribution, hence one has to sample from a distribution close to it. It is a common practice to require that the statistical distance of the sampled distribution from the desired discrete Gaussian be less than $2^{100}$. A number of Gaussian sampling algorithms for lattice-based cryptosystems may be utilized herein without limitation Furthermore, a novel implementation of cumulative distribution function (CDF) inversion sampler with high precision and large tail bound has been demonstrated with maximum statistical distance of $2^{-90}$ to a theoretical discrete Gaussian distribution. Such a sampler takes on average 9.44 random bits and 2.28 clock cycles to generate a sample and consumes 1 block RAM with 17 slices on a Spartan-6 FPGA. Hence, efficient and practical Gaussian sampling for lattice-based cryptography is becoming more practical.

Generation of shares may also utilize concepts related to the Learning With Errors (LWE) problem. The learning with errors (LWE) problem requires to recover a secret s given a sequence of 'approximate' random linear equations on it. LWE is known to be hard based on certain assumptions regarding the worst-case hardness of standard lattice problems such as GapSVP (decision version of the Shortest Vector Problem) and SIVP (Shortest Independent Vectors Problem). Many cryptosystems have been constructed whose security can be proven under the LWE problem, including (identity-based, leakage-resilient, fully homomorphic, functional) encryption, oblivious transfer, (blind) signatures, pseudorandom functions (PRFs), key-homomorphic PRFs, key-homomorphic constrained PRFs, hash functions, etc.

Two examples of implementation of LWE are described. The first is Decision-LWE. In this example, for positive integers n (the security parameter) and $q \geq 2$, and an error (probability) distribution $\chi = \chi(n)$ over $\mathbb{Z}_q$, the decision-LWE$_{n,q,\chi}$ problem is to distinguish between the following pairs of distributions:
(A, $A^T s + e$) and (A, u),
where $m = \text{poly}(n)$, $$A \xleftarrow{\$} \mathbb{Z}_q^{n \times m}, s \xleftarrow{\$} \mathbb{Z}_q^n, e \xleftarrow{\$} \chi^m, \text{ and } u \xleftarrow{\$} \mathbb{Z}_q^m.$$

The other is Search-LWE for which positive integers n (the security parameter) and $q \geq 2$, and an error (probability) distribution $\chi = \chi(n)$ over $\mathbb{Z}_q$, the search-LWE$_{n,q,\chi}$ problem is to recovers $s \in \mathbb{Z}_q^n$, given $m(=(n))$ independent samples of $(A, A^T s + e)$, where $$A \xleftarrow{\$} \mathbb{Z}_q^{n \times m}, s \xleftarrow{\$} \mathbb{Z}_q^n, \text{ and } e \xleftarrow{\$} \chi^m.$$

For security parameter $\lambda$ such that $n=(\lambda)$, it has been proven that for a certain noise distribution $\chi$ and a sufficiently large q, the LWE problem is as hard as the worst-case SIVP (Shortest Independent Vectors Problem) and GapSVP (decision version of the Shortest Vector Problem) under a quantum reduction. These results have been extended to show that s can be sampled from a low norm distribution (in particular, from the noise distribution $\chi$) and the resulting problem is as hard as the basic LWE problem. Similarly, the noise distribution $\chi$ can be a simple low-norm distribution.

Note that the seed and error vectors in the definitions can be replaced by matrices of appropriate dimensions, that are sampled from the same distributions as the vectors. Such interchange does not affect the hardness of LWE.

The present disclosure may also utilize Trapdoors for Lattices. Trapdoors for lattices utilized in the present disclosure are provided herein. For example, let m≥nk be an integer and $\bar{m}$=m-nk. For A∈$\mathbb{Z}_q^{n \times m}$, it may be that R∈$\mathbb{Z}_q^{\bar{m} \times nk}$ is a trapdoor for A with tag H∈$\mathbb{Z}_q^{n \times n}$ if $$A \begin{bmatrix} R \\ I \end{bmatrix} = H \cdot G,$$

where G∈$\mathbb{Z}_q$ is a primitive matrix.

Given a trapdoor R for A, and an LWE instance B=AS+E mod q for some "short" (with small enough infinity or Euclidean norm) error matrix E∈$\mathbb{Z}^{m \times n}$, the LWE inversion algorithm from successfully recovers S (and E) with overwhelming probability.

In addition, the present disclosure may utilize Multilinear Maps. Extending bilinear elliptic curve pairings to multilinear maps is a long-standing open problem. Two interesting applications of multilinear maps have been proposed, namely multipartite Diffie-Hellman and very efficient broadcast encryption. However, such maps have been considered not possible from the realm of algebraic geometry. Bilinear pairings may provide that the encoding a·g of an element a is randomized (with some noise) instead of deterministic; only the computed multilinear map e($a_i$·g, . . . , $a_k$·g) is a deterministic function of the $a_i$'s only. The construction has bounded degree with a maximum degree k at most polynomial in the security parameter. Indeed, the encoding noise grows linearly with the degree, and when the noise reaches a certain threshold, the encoding can become incorrect similar to the ciphertexts in a somewhat homomorphic encryption scheme. The security of the construction relied on new hardness assumptions which seemed natural extensions of the Decisional Diffie-Hellman (DDH) assumption.

The GGH15 scheme is one type of family of multilinear maps, based on the LWE problem with encoding over matrices. A graded encoding scheme for an algebraic "plaintext ring R" provides methods for encoding the ring elements and manipulating the resulting encodings. Such schemes allow a "canonical representation" of the plaintext element to be extracted from its encoding. GGH15 encodes LWE samples in short square matrices of higher dimensions. Addition and multiplication of the encodings corresponds to addition and multiplication of the LWE secrets. The plaintext space is the non-commutative ring of matrices R=$\mathbb{Z}_q^{n \times n}$. The construction is parametrized by a directed acyclic graph (DAG), G=(V, E), with diameter d. A matrix $$A_v \xleftarrow{\$} \mathbb{Z}_q^{n \times m}$$

is associated with each node v∈V, and encodings in the scheme are defined relative to the paths in G. A small plaintext matrix S∈R is encoded with respect to a path u⇝v via another small matrix D∈$\mathbb{Z}_q^{m \times m}$, such that D·$A_u$≈$A_v$·S. Given 'trapdoor information' $\tau_u$ for matrix $A_u$ and error distribution $\chi = D_{\mathbb{Z},s}$, GGH15 generates an encoding D for S with respect to source u and sink v, such that: D·$A_u$=$A_v$·S+E, where E←$(\chi)^{m \times n}$ is an LWE error matrix. As the trapdoor information is given for $A_u$ and not $A_v$, the LWE instance {$A_u$, $B_v$(=$A_v$·S+E)} can still be hard for appropriate parameters. The arithmetic operations are just matrix operations in $\mathbb{Z}_q^{m \times n}$. It is easy to see that two encodings, $D_1$ and $D_2$, relative to the same path u⇝v can be added, namely from: $D_1$·$A_u$=$A_v$·$S_1$+$E_1$ and $D_2$·$A_u$=$A_v$·$S_2$+$E_2$, we obtain: ($D_1$+$D_2$)·$A_u$=$A_v$·($S_1$+$S_2$)+$E_1$+$E_2$, all matrices, $S_1$+$S_2$, $E_1$ $E_2$ and $D_1$+$D_2$, are still small. Encodings relative to paths v⇝w and u⇝v, can be multiplied to get an encoding relative to path u⇝w. Namely given $D_1$·$A_v$=$A_w$·$S_1$+$E_1$ and $D_2$·$A_u$=$A_v$·$S_2$+$E_2$, we obtain: $D_1$·$D_2$·$A_u$=$D_1$·($A_v$·$S_2$+$E_2$)=$A_w$·$S_1$·$S_2$+E', the matrices, $D_1$·$D_2$, $S_1$·$S_2$ and E' are still small.

With reference to FIG. 1, such a secret sharing scheme 100 is depicted schematically. The scheme 100 includes a share generator 110. The share generator 110 may comprise a share generation module executable by the computing device comprising the share generator. The share generator 110, as described above, receives as inputs trust structures Γ from each party, a security parameter ω, a set of ℓ polynomial-time parties 120, and a secret 130 k. In turn, the share generator 110 may utilize the share generation algorithm to generate shares {$\Pi_1^{(k)}, \ldots \Pi_\ell^{(k)}$} that are distributed to the parties. 120. The share generator 110 may comprise a computing device comprising, for example, one or more hardware processors and memory devices. The hardware processors may access the share generation algorithm, which may be stored in a memory device of the share generator 110. In turn, the one or more hardware processors of the share generator 110 may execute the share generation algorithm to generate the shares. The shares may be communicated to the parties 120a, 120b, . . . 120n, which themselves may be computing devices comprising one or more hardware processors and memory devices. The shares may be communicated to the parties 120 by way of a network or other digital communication methodology. In this regard, the shares may be stored in a respective memory device of the party 120 that receives the shares. As described above, the secret 130 may comprise data received at the share generator 110. A share may comprise share data that is provided to and stored in a memory device of each respective parties 120.

Figure 2:
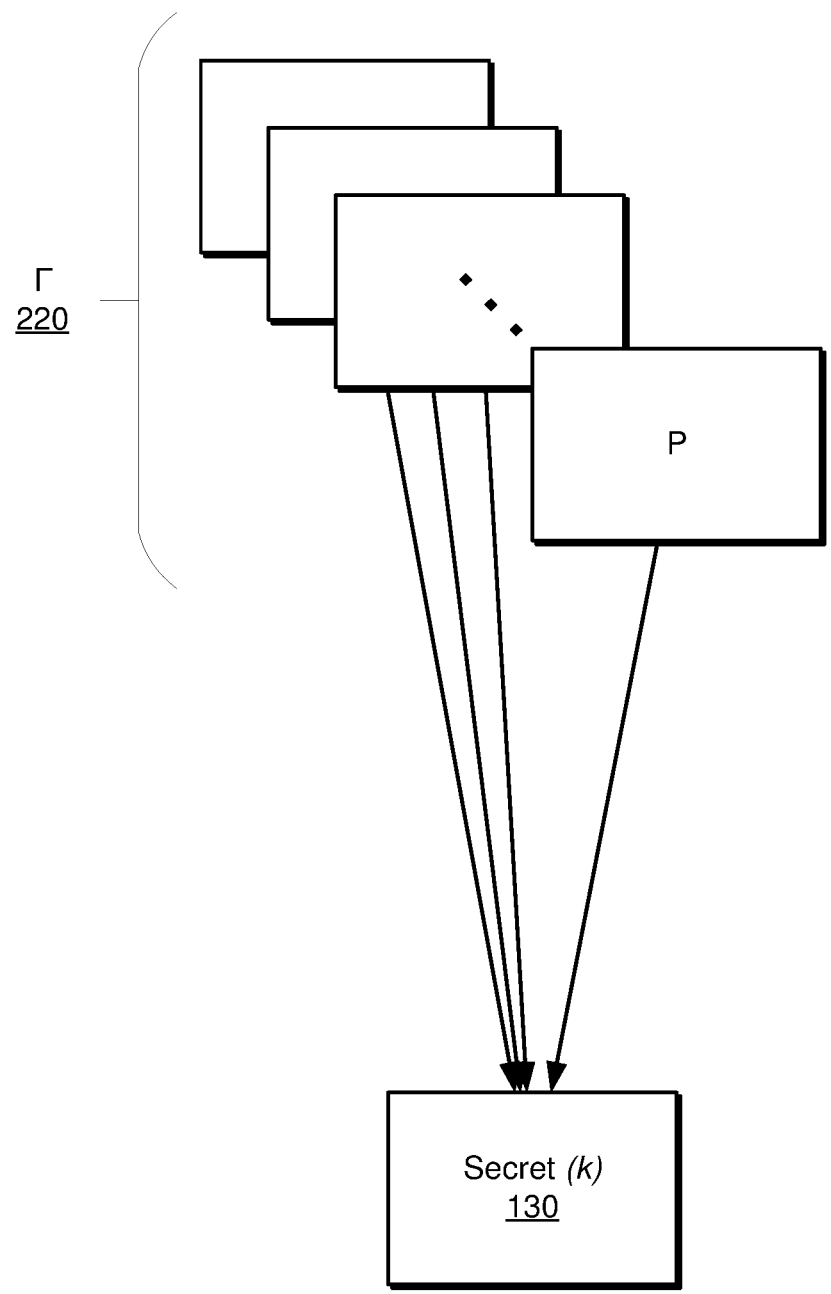
FIG. 2 illustrates an example of a request for secret reconstruction from a plurality of participant computing devices belonging to an authorized subset.

In turn, with further reference to FIG. 2, when participants 220 comprising an authorized set defined by the trust structure F exchange their shares, the secret 130 k may be output. The trust structure F may be at least in part based on trust structures provided by the parties 120 that are used in the share generation algorithm executed by the share generator 110. Thus, the shares provided to the parties may have encoded therein trust structures without providing any information regarding the trust structure to a party having a share. However, upon exchanging the shares, the shares provided may reconstruct the secret 130 when the participants 220 comprise an authorized subset based on the trust structures. In this regard, the shares may be provided by the participants 220 in a request to reconstruct the secret.

Figure 3:
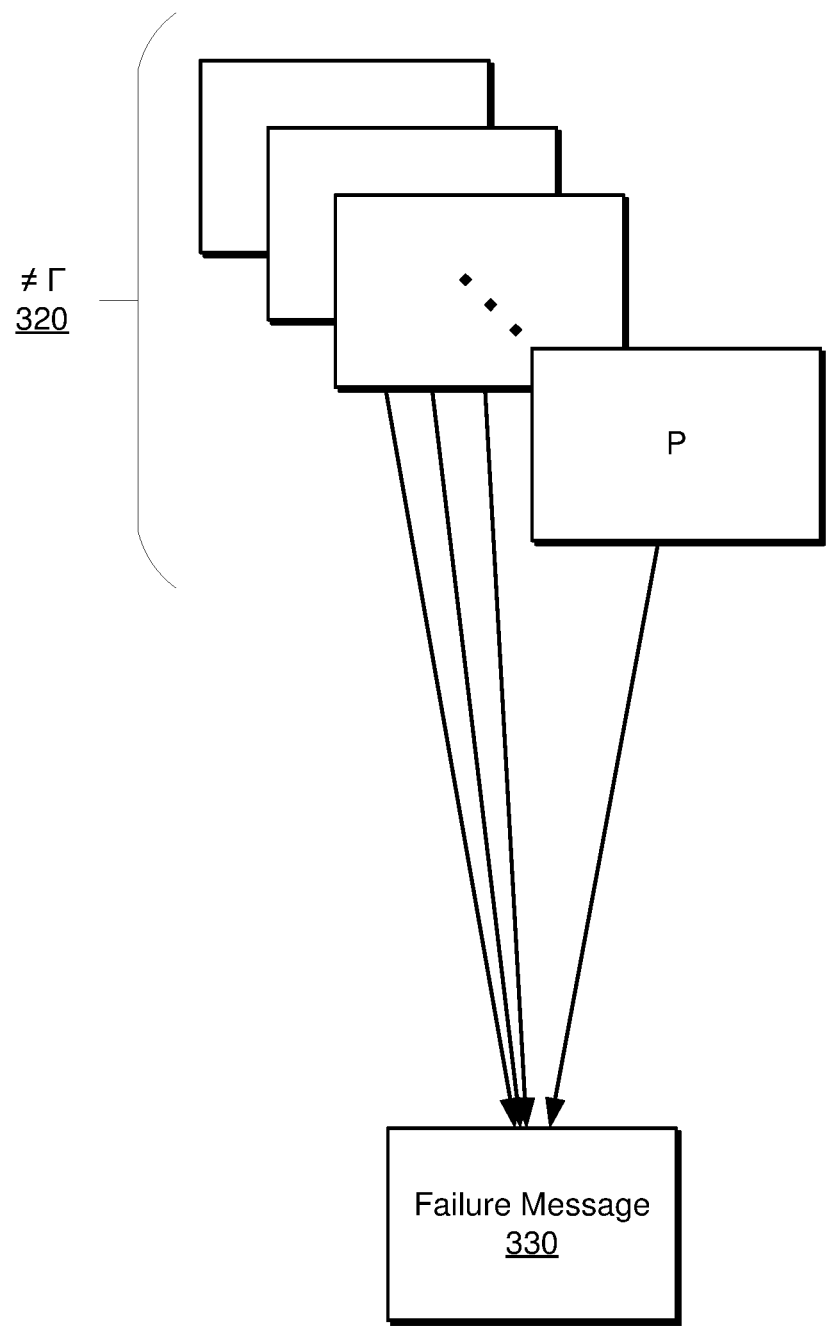
FIG. 3 illustrates an example of a request for secret reconstruction from a plurality of participant computing devices not belonging to an authorized subset.

With further reference to FIG. 3, if the participants are not an authorized subset, the participants 330 exchanging shares will not be capable of a result that outputs the secret 130 upon execution of the secret reconstruction algorithm. Rather, a failure message 330 may be output indicating the secret was not reconstructed.

The secret sharing scheme discussed herein utilizes construction of set systems with certain intersection restrictions and bounding size. The scheme also utilizes discrete Gaussian sampling, learning with errors (LWE), trapdoors for lattices, and multilinear maps (e.g., GGH15).

Combinatorial objects utilized in the secret sharing scheme are described below. For example, let $\{G_1, G_2, \ldots, G_t\}$ be a family of sets, which may relate to combinations of participants each providing shares in a secret sharing scheme. The set family is non-degenerate if there does not exist $1 \leq i \leq t$ such that $G_i \subseteq G_j$ for all $1 \leq j \leq t$. Also, let $m \geq 2$, $t \geq 2$ be integers and $\mathcal{H}$ be a set-system. We shall say that $\mathcal{H}$ has t-wise restricted intersections modulo m if the following bounding conditions are provided:

Bounding condition 1. $\forall \mathcal{H} \in \mathcal{H}$, $|H| \equiv 0 \bmod m$, Bounding condition 2. $\forall t'$ satisfying $2 \leq t' \leq t$, and $\forall H_1, H_2, \ldots, H_{t'} \in \mathcal{H}$ with $\{H_1, H_2, \ldots, H_{t'}\}$ non-degenerate, $$\left|\bigcap_{\tau=1}^{t'} H_\tau\right| \not\equiv 0 \bmod m$$

Furthermore, let $m \geq 2$ and $l \geq 2$ be integers such that m has no prime factors $\leq l$. Suppose there exists an integer $t \geq 2$ and a uniform set system $\mathcal{G}$ satisfying the conditions:

Set condition 1. $\forall G \in \mathcal{G}$, $|G| \equiv 0 \bmod m$,

Set condition 2. $\forall t'$ such that $2 \leq t' \leq t$, and $\forall G_1, G_2, \ldots, G_{t'} \in \mathcal{G}$ distinct, $$\left|\bigcap_{\tau=1}^{t'} G_\tau\right| \equiv \mu \bmod m$$

for some $\mu$ such that $\mu \not\equiv 0 \bmod m$ and $\mu \equiv 0$ or $1 \bmod p$ for all primes p dividing m, Set condition 3. $|\bigcap_{G \in \mathcal{G}} G| \not\equiv 0 \bmod m$.

With this scenario, there exists a set-system $\mathcal{H}$, explicitly constructible from the set system $\mathcal{G}$, which contains sets with exactly two different sizes, such that:

Construction Proposition 1. $\forall H_1, H_2 \in \mathcal{H}$, either $|H_1|=|H_2|=|H_1|=l|H_2|$ or $l|H_1|=|H_2|$, Construction Proposition 2. $\mathcal{H}$ has t-wise restricted intersections modulo m.

In this regard, subset-superset relationships may be established such that any superset of an authorized subset is also authorized to reconstruct the secret.

Expanding the proof of the foregoing scenario, a l uniform set systems $\mathcal{H}_1, \mathcal{H}_2, \ldots, \mathcal{H}_l$ is provided satisfying the following properties:

Set Property 1. $\forall H \in \mathcal{H}_i$, $|H| \equiv 0 \bmod m$,

Set Property 2. $\forall t'$ such that $2 \leq t' \leq t$, and $\forall H_1, H_2, \ldots, H_{t'} \in \mathcal{H}_i$ distinct, $$\left|\bigcap_{\tau=1}^{t'} H_\tau\right| \equiv \mu \bmod m$$

for some $\mu$ such that $\mu \not\equiv 0 \bmod m$ and $\mu \equiv 0$ or $1 \bmod p$ for all primes p dividing m, Set Property 3. $|\bigcap_{H \in \mathcal{H}_i} H| \not\equiv 0 \bmod m$, Set Property 4. $|H_i|=|H_j|$ for all $H_i \in \mathcal{H}_i$, $H_j \in \mathcal{H}_j$, Set Property 5. $|\bigcap_{H_i \in \mathcal{H}_i} H_i| = |\bigcap_{H_j \in \mathcal{H}_j} H_j|$ for all $1 \leq i, j \leq l$.

Bijections may be fixed:

$$f_{i,j}: \bigcap_{H_i \in \mathcal{H}_i} H_j \to \bigcap_{H_j \in \mathcal{H}_j} H_j.$$

such that $f_{i,i}$ is the identity and $f_{i,j} \circ f_{j,k} = f_{i,k}$ for all $1 \leq i,j,k \leq l$. Using these bijections, we can identify the sets $\bigcap_{H_i \in \mathcal{H}_i} H_i$ and $\bigcap_{H_j \in \mathcal{H}_i} H_j$ with each other, so let $$A = \bigcap_{H_1 \in \mathcal{H}_1} H_1 = \bigcap_{H_2 \in \mathcal{H}_2} H_2 = \ldots = \bigcap_{H_l \in \mathcal{H}_l} H_l.$$

The elements of the sets in $\mathcal{H}_i$ may be treated as being distinct from the elements of the sets in $\mathcal{H}_j$, except for the above identification of elements in $\bigcap_{H_i \in \mathcal{H}_i} H_i$ with elements in $\bigcap_{H_j \in \mathcal{H}_j} H_j$. Let $a=|A|$, and let $\beta_1, \beta_2, \ldots, \beta_{(l-1)a}$ be elements that are distinct from all the elements in the sets in $\mathcal{H}_1, \mathcal{H}_2, \ldots \mathcal{H}_l$. The set may be defined:

$$B = \beta_1, \beta_2, \ldots, \beta_{(l-1)a}.$$

In addition, a set system IC may be provided with sets:

$H_i$ for $H_i \in \mathcal{H}_i$, some $1 \leq i \leq l$, $\cup_{i=1}^{l} H_i \cup B$ for $H_i \in \mathcal{H}_i$, The common size of the sets may be written in the uniform set systems $\mathcal{H}_i$ as km for some $k > 0$. Then, for $H_i \in \mathcal{H}_i$, $$\left|\bigcup_{i=1}^{l} H_i \cup B\right| = \left|\bigcup_{i=1}^{l} H_i\right| + |B| = \sum_{i=1}^{l} |H_i| - (l-1)|A| + |B|$$
$$= l(km) - (l-1)a + (l-1)a = lkm,$$

where the second equality comes from the fact that $H_i \cap H_j = A$ for all $i \neq j$. This shows that Construction Proposition 1 holds.

In relation to Construction Proposition 2 that $\mathcal{H}$ has t-wise restricted intersections modulo m, the proof may be shown by letting $t_1, t_2, \ldots, t_{l+1} \geq 0$ be such that $2 \leq t' = t_1 + t_2 + \ldots + t_{l+1} \leq t$. Considering the intersection of the sets:

$H_{i,\tau}$ where $1 \leq i \leq l$, $1 \leq \tau \leq t_i$ and $H_{i,\tau} \in \mathcal{H}_i$, $\cup_{i=1}^{l} H'_{i,\tau} \cup B$ where $1 \leq \tau \leq T_{l+1}$ and $H'^{i,\tau} \in \mathcal{H}_i$.

Assume that these sets form a non-degenerate family. In turn, let $$\sigma = \left|\bigcap_{i=1}^{l}\bigcap_{\tau=1}^{t_i} H_{i,\tau} \cap \bigcap_{\tau=1}^{t_{l+1}} (H'_{1,\tau} \cup H'_{2,\tau} \cup \ldots \cup H'_{l,\tau} \cup B)\right|$$
$$= \left|\bigcap_{i=1}^{l}\bigcap_{\tau=1}^{t_i} H_{i,\tau} \cap \bigcap_{\tau=1}^{t_{l+1}} (H'_{1,\tau} \cup H'_{2,\tau} \cup \ldots \cup H'_{l,\tau})\right| + \epsilon |B|,$$

where $\epsilon = 1$ if $t_1 = t_2 = \ldots = t_l = 0$ and $\epsilon = 0$ otherwise.

If two or more of $t_1, t_2, \ldots, t_l$ are non-zero, $\tau = |A| = a \not\equiv 0 \bmod m$. If exactly one of $t_1, t_2, \ldots, t_l$ is non-zero, say $t_i \neq 0$, then $$\sigma = \left| \bigcap_{\tau=1}^{t_i} H_{i,\tau} \cap \bigcap_{\tau=1}^{t_{l+1}} H'_{i,\tau} \right| \not\equiv 0 \bmod m$$

since $H_{i,\tau}$ (for $1 \le \tau \le t_i$) and $H'^{i,\tau}$ (for $1 \le \tau \le t_{l+1}$) are not all the same by the assumption of non-degeneracy. If $t_1 = t_2 = \ldots = t_l = 0$, then $$\sigma = \left| \bigcap_{\tau=1}^{t_{l+1}} (H'_{1,\tau} \cup H'_{2,\tau} \cup \ldots \cup H'_{l,\tau}) \right| + |B|$$

$$= \sum_{i=1}^{l} \left| \bigcap_{\tau=1}^{t_{l+1}} H'_{i,\tau} \right| - (l-1)|A| + |B| \equiv \sum_{i=1}^{l'} \mu_i \bmod m$$

for some $1 \le l' \le l$ and some $0 < \mu_1, \mu_2, \ldots, \mu_{l'} < m$ such that each $\mu_i \equiv 0$ or $1 \bmod p$ for all primes $p$ dividing $m$. Since $\mu_i \not\equiv 0 \bmod m$ for all $1 \le i \le l'$, there must be some prime $p$ dividing $m$ for which at least one of the $\mu_i$'s satisfy $\mu_i \equiv 1 \bmod p$. Then, for this prime $p$, $$\sigma \equiv \sum_{i=1}^{l'} \mu_i \not\equiv 0 \bmod p$$

since $p$, being a prime factor of $m$, satisfies $p > l \ge l'$, and since each $\mu_i \equiv 0$ or $1 \bmod p$. In this regard, Construction Proposition 2 holds.

In addition, suppose that $|\mathcal{G}| = s$ and that the number of elements in the universe of $\mathcal{G}$ is $g$. Then, there are $ls$ sets of size $km$ and $s^l$ sets of size $lkm$ in $\mathcal{H}$, so $|\mathcal{H}| = s^l + ls$. The universe of $\mathcal{H}$ has $lg$ elements. Also, for each $H \in \mathcal{H}$, exactly one of the following is true:

(a) H is a subset of exactly $s^{l-1}$ sets and not a superset of any sets in $\mathcal{H}$, (b) H is a superset of exactly $l$ sets and not a subset of any sets in $\mathcal{H}$.

In order to explicitly construct set systems which, in addition to having the Bounding Conditions stated above, have sizes super-polynomial in the number of elements, the following details an approach used to construct a super polynomial uniform set-system that provides a solution for reconstruction of a secret from participants belonging to an authorized set based on the trust structures encoded with the secret shares.

Let $m = p_1^{\alpha_1} p_2^{\alpha_2} \ldots p_r^{\alpha_r}$ be a positive integer with $r > 1$ distinct prime divisors. For every integer $n \ge 1$, there exists an explicitly constructible polynomial P in n variables such that
1. $P(0, 0, \ldots, 0) \equiv 0 \bmod m$,
2. $P(x) \not\equiv 0 \bmod m$ for all $x \in \{0,1\}^n$ such that $x \ne (0, 0, \ldots, 0)$,
3. $P(x) \equiv 0$ or $1 \bmod p_i$ for all $x \in \{0,1\}^n$ such that $x \ne (0, 0, \ldots, 0)$, $1 \le i \le r$.

The polynomial P has degree $d = \max(p_1^{e_1}, p_2^{e_2}, \ldots, p_r^{e_r}) - 1$ where $e_i$ is the smallest integer that satisfies $$p_i^{e_i} > \left\lceil n^{\frac{1}{r}} \right\rceil.$$

Define $Q(x_1, x_2, \ldots, x_n) = P(1-x_1, 1-x_2, \ldots, 1-x_n)$. Then
1. $Q(1, 1, \ldots, 1) \equiv 0 \bmod m$,
2. $Q(x) \not\equiv 0 \bmod m$ for all $x \in \{0,1\}^n$ such that $x \ne (1, 1, \ldots, 1)$.
3. $Q(x) \equiv 0$ or $1 \bmod p_i$ for all $x \in \{0,1\}^n$ such that $x \ne (1, 1, \ldots, 1)$, $1 \le i \le r$.

In addition, let $m = p_1^{\alpha_1} p_2^{\alpha_2} \ldots p_r^{\alpha_r}$ be a positive integer with $r > 1$ distinct prime divisors. For every integer $n \ge 1$, there exists a uniform set system $\mathcal{G}$ over a universe of $g$ elements which is explicitly constructible from the polynomial Q of degree d such that 1. $g < \dfrac{2(m-1)n^{2d}}{d!}$ if $n \ge 2d$, 2. $|\mathcal{G}| = n^n$,
3. $\forall G \in \mathcal{G}$, $|G| \equiv 0 \bmod m$,
4. $\forall G, H \in \mathcal{G}$ such that $G \ne H$, $|G \cap H| \equiv \mu \bmod m$ for some $\mu$ such that $\mu \not\equiv 0 \bmod m$ and $\mu \equiv 0$ or $1 \bmod p_i$ for all $1 \le i \le r$, 5. $|\bigcap_{G \in \mathcal{G}} G| \not\equiv 0 \bmod m$.

Note that (v) follows from the fact that:

$$\left| \bigcap_{G \in \mathcal{G}} G \right| \equiv Q(0, 0, \ldots, 0) \not\equiv 0 \bmod m.$$

Furthermore, let $m = p_1^{\alpha_1} p_2^{\alpha_2} \ldots p_r^{\alpha_r}$ be a positive integer with $r > 1$ distinct prime divisors. For all integers $t \ge 2$ and $n \ge 1$, there exists a uniform set system $\mathcal{G}$ over a universe of $g$ elements which is explicitly constructible from the polynomial Q of degree d such that
1.

$$g < \frac{2(m-1)n^{2d}}{d!} \text{ if } n \ge 2d,$$

2. $|\mathcal{G}| = n^n$,
3. $\forall G \in \mathcal{G}$, $|G| \equiv 0 \bmod m$,
4. $\forall t'$ such that $2 \le t' \le t$, and $\forall G_1, G_2, \ldots, G_{t'} \in \mathcal{G}$ distinct, $$\left| \bigcap_{\tau=1}^{t'} G_\tau \right| \equiv \mu \bmod m$$

for some $\mu$ such that $\mu \not\equiv 0 \bmod m$ and $\mu \equiv 0$ or $1 \bmod p_i$ for all $1 \le i \le r$, 5. $|\bigcap_{G \in \mathcal{G}} G| \not\equiv 0 \bmod m$.

The polynomial Q can be written as $$Q(x_1, x_2, \ldots, x_n) = \sum_{i_1 < i_2 < \ldots < i_l} a_{i_1, i_2, \ldots, i_l} x_{i_1} x_{i_2} \ldots x_{i_l}$$

Define:

$$\tilde{Q}(x_1, x_2, \ldots, x_n) = \sum_{i_1 < i_2 < \ldots < i_l} \tilde{a}_{i_1, i_2, \ldots, i_l} x_{i_1} x_{i_2} \ldots x_{i_l}$$

where $\tilde{a}_{i_1, i_2, \ldots, i_l}$ is the remainder when $a_{i_1, i_2, \ldots, i_l}$ is divided by m.

Let $[0, n-1] = \{0, 1, \ldots, n-1\}$. Define the function $\delta: [0, n-1]^t \to \{0,1\}$ as $$\delta(u_1, u_2, \ldots, u_t) = \begin{cases} 1 & \text{if } u_1 = u_2 = \ldots = u_t, \\ 0 & \text{otherwise.} \end{cases}$$

For $y_1, y_2, \ldots, y_t \in [0, n-1]^n$, let $$a^{y_1, y_2, \ldots, y_t} = \tilde{Q}(\delta(y_{1,1}, y_{2,1}, \ldots, y_{t,1}), \ldots, \delta(y_{1,n}, y_{2,n}, \ldots, y_{t,n})) \bmod m.$$

Then:

$$a^{y_1, y_2, \ldots, y_t} = \sum b_{i_1, i_2, \ldots, i_l}^{y_1, y_2, \ldots, y_t}$$

where $$b_{i_1, i_2, \ldots, i_l}^{y_1, y_2, \ldots, y_t} = \prod_{j=1}^{l} \delta(y_{1, i_j}, y_{2, i_j}, \ldots, y_{t, i_j}).$$

Each summand $$b_{i_1, i_2, \ldots, i_l}^{y_1, y_2, \ldots, y_t}$$

corresponds to a monomial of $\tilde{Q}$ and occurs with multiplicity $\tilde{a}_{i_1, i_2, \ldots, i_l}$ in the above sum.

It is easy to check that there exists partitions $\mathcal{P}_{i_1, i_2, \ldots, i_l}$ of $[0, n-1]^n$ such that for all $y_1, y_2, \ldots, y_t \in [0, n-1]^n$, $$b_{i_1, i_2, \ldots, i_l}^{y_1, y_2, \ldots, y_t} = \begin{cases} 1 & \text{if } y_1, y_2, \ldots, y_t \text{ belong to the same block } \mathcal{P}_{i_1, i_2, \ldots, i_l}, \\ 0 & \text{otherwise.} \end{cases}$$

A block in the partition $\mathcal{P}_{i_1, i_2, \ldots, i_l}$ covers $y \in [0, n-1]^n$ if $y$ is an element of the block.

A set system $\mathcal{G}$ is defined as follows: the sets in $\mathcal{G}$ correspond to $y$ for $y \in [0, n-1]^n$, and the set corresponding to $y$ has elements given by the blocks that cover $y$.

The set $y$ in the set system $\mathcal{G}$ has size equal to the number of blocks that cover $y$, which is equal to $$a^{y, y, \ldots, y} = \tilde{Q}(1, 1, \ldots, 1) \equiv 0 \bmod m.$$

For any $2 \leq t' \leq t$, and $y_1, y_2, \ldots, y_{t'} \in [0, n-1]^n$ distinct, some block of $\mathcal{P}_{i_1, i_2, \ldots, i_l}$ covers all of $y_1, y_2, \ldots, y_{t'}$ if and only if $$b_{i_1, i_2, \ldots, i_l}^{y_1, y_2, \ldots, y_{t'}, \ldots, y_{t'}} = 1$$

(note that $y_{t'}$ occurs in the superscript $t-t'+1$ times). So, the number of such blocks is equal to $$a^{y_1, y_2, \ldots, y_{t'}, \ldots, y_{t'}} \not\equiv 0 \bmod m.$$

The following theorem can be proved by, letting $m = p_1^{a_1} p_2^{a_2} \cdots p_r^{a_r}$ be a positive integer with $r > 1$ distinct prime divisors, and $l \geq 2$ be an integer such that $l < \min(p_1, p_2, \ldots, p_r)$. Then, for all integers $t \geq 2$ and $n \geq 1$, there exists an explicitly constructible set-system $\mathcal{H}$ which contains sets with exactly 2 different sizes, defined over a universe of $h$ elements, such that 1. $h < 2l(m-1)n^{4mn^{\frac{1}{r}}}$ if $n \geq (4m)^{1+\frac{1}{r-1}}$, 2. $|\mathcal{H}| = n^{ln} + \ln^n$, 3. $\forall H_1, H_2 \in \mathcal{H}$, either $|H_1| = |H_2|$, $|H_1| = l|H_2|$ or $l|H_1| = |H_2|$, 4. $\mathcal{H}$ has t-wise restricted intersections modulo m.

As noted above, there exists a uniform set-system $\mathcal{G}$ that satisfies Set Conditions 1-3 above which is defined over a universe of $g$ elements, such that $|\mathcal{G}| = n^n$. Furthermore, we know that $$g < \frac{2(m-1)n^{2d}}{d!}$$

provided the condition $n \geq 2d$ is satisfied.

As provided above, $d = \max(p_1^{e_1}, p_2^{e_2}, \ldots, p_r^{e_r}) - 1$ where $e_i$ is the smallest integer that satisfies $$p_i^{e_i} > \lceil n^{\frac{1}{r}} \rceil,$$

from which we obtain the inequality $$d < \max(p_1, p_2, \ldots, p_r) \lceil n^{\frac{1}{r}} \rceil < 2mn^{\frac{1}{r}}.$$

Hence if $$n \geq (4m)^{1+\frac{1}{r-1}}, \text{ then } n^{\frac{r-1}{r}} \geq 4mn \geq 4mn^{\frac{1}{r}} > 2d,$$

and thus we have $$g < \frac{2(m-1)n^{2d}}{d!} < 2(m-1)n^{2d} < 2(m-1)n^{4mn^{\frac{1}{r}}}.$$

Applying the Bounding Conditions with the above set system $\mathcal{G}$, we obtain a set system $\mathcal{H}$ satisfying (iii) and (iv). $\mathcal{H}$ has size $$|\mathcal{H}| = (n^n)^l + l(n^n) = n^{ln} + \ln^n$$

and the number of elements in the universe of $\mathcal{H}$ is $$h = lg < 2l(m-1)n^{4mn^{\frac{1}{r}}}$$

provided that $$n \geq (4m)^{1+\frac{1}{r-1}}.$$

Figure 4:
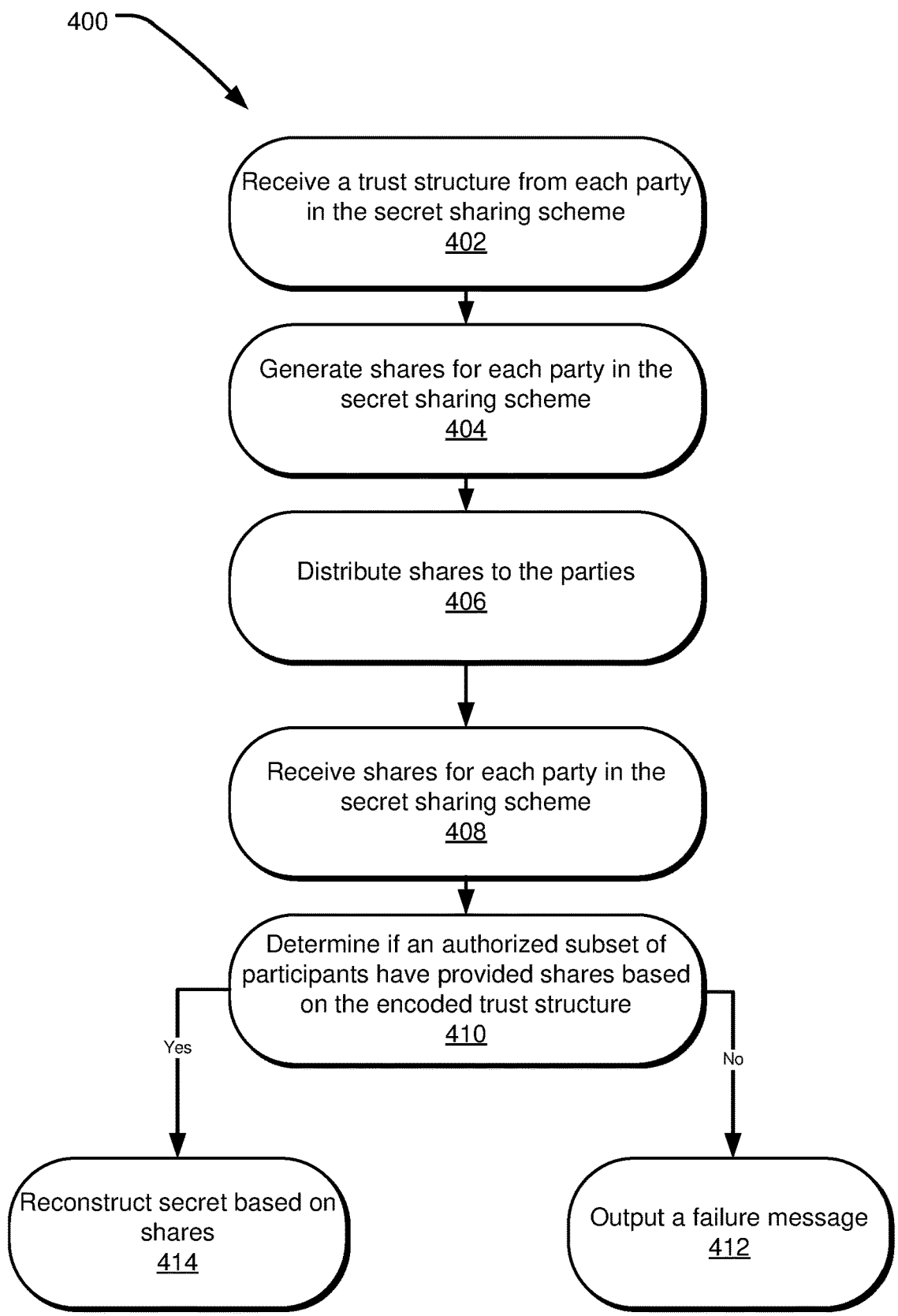
FIG. 4 illustrates example operations for execution of a secret sharing scheme as described herein.

FIG. 4 illustrates example operations 400 for implementation of a secret sharing scheme as described herein. The operations 400 may include a receiving operation 402 in which a trust structure is received from each party in the scheme. This may include a trust structure and an adversary structure.

The operations 400 may also include a generating operation 404 in which shares are generated that include encoded information regarding the trust structure that may be used to determine authorized subsets for a reconstruction of a secret. The shares are distributed to the parties in a distributing operation 406.

The operations 400 may also include a receiving operation 408 in which shares from each participant are received. A determining operation 410 may determine if an authorized subset of participating computing devices is present in the request to reconstruct the secret. The authorized subset may be based on the encoded trust structure of the shares received in the receiving operation 408. If an authorize subset is not present, the reconstruction fails and an output operation 412 may output a failure message. However, if it is determined that an authorized subset is present, then a reconstructing operation 414 may reconstruct the secret. In turn, the secret may be provided to the participating set of parties.

Figure 5:
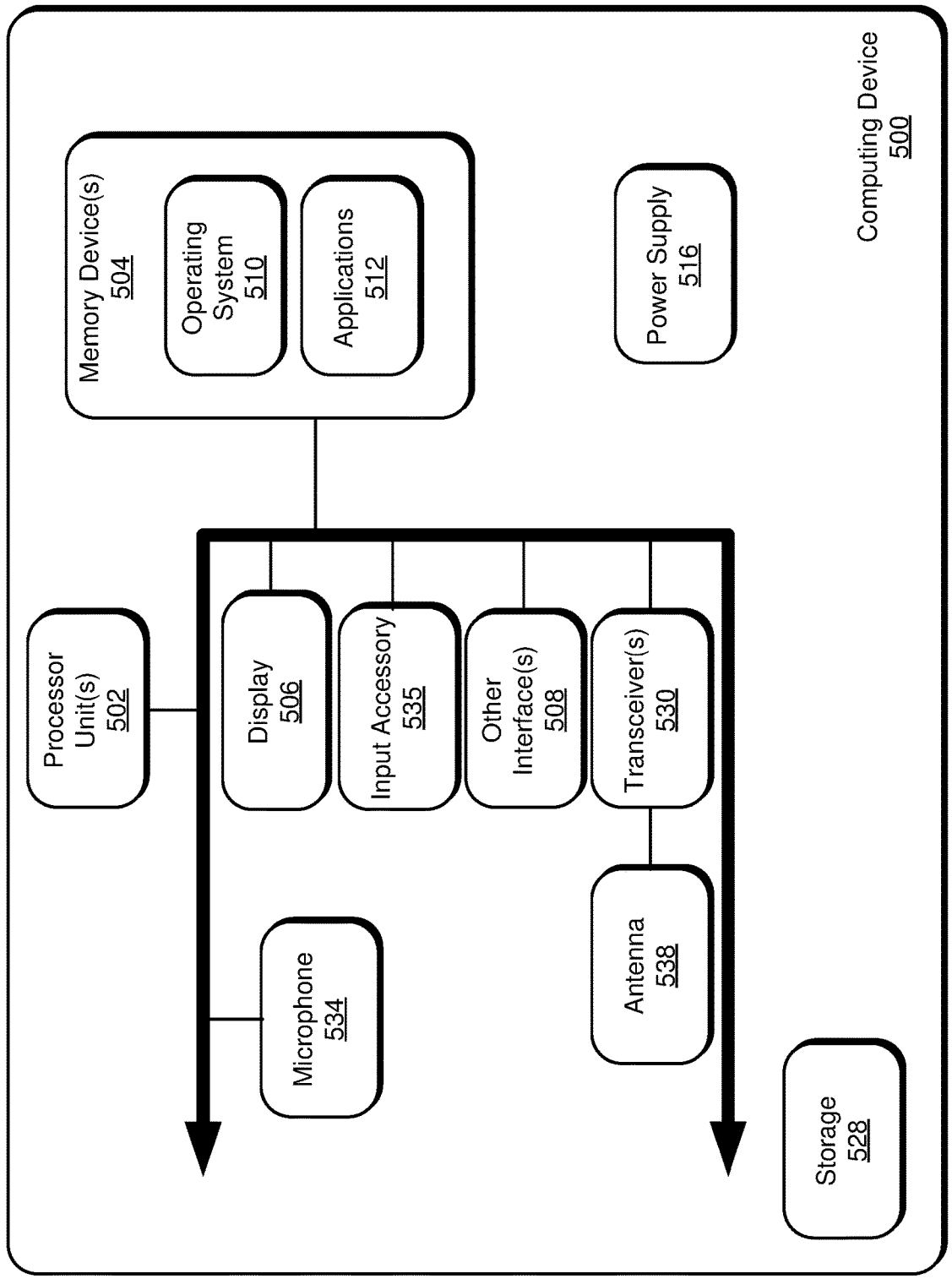
FIG. 5 illustrates an example of a computing device capable of providing functionality associated with the secret sharing scheme described herein.

As described above, a secret sharing scheme as described herein may be used by a plurality of computing devices for computational secret sharing of a secret comprising data in a memory device. FIG. 5 illustrates an example schematic of a computing device 500 suitable for implementing aspects of the disclosed technology including any of the foregoing computing devices utilized in a secret sharing scheme including a party, secret generator, and/or dealer as described above. The computing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Apple macOS operating system, or the Linux operating system, resides in the memory 504 and is executed by the processor unit(s) 502, although it should be understood that other operating systems may be employed.

One or more applications 512 are loaded in the memory 504 and executed on the operating system 510 by the processor unit(s) 502. Applications 512 may receive input from various input local devices such as a microphone 534, input accessory 535 (e.g., keypad, mouse, stylus, touchpad, joystick, instrument mounted input, or the like). Additionally, the applications 512 may receive input from one or more remote devices such as remotely-located smart devices by communicating with such devices over a wired or wireless network using more communication transceivers 530 and an antenna 538 to provide network connectivity (e.g., a mobile phone network, Wi-Fi®, Bluetooth®). The computing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The computing device 500 further includes a power supply 516, which is powered by one or more batteries or other power sources and which provides power to other components of the computing device 500. The power supply 516 may also be connected to an external power source (not shown) that overrides or recharges the built-in batteries or other power sources.

In an example implementation, the computing device 500 comprises hardware and/or software embodied by instructions stored in the memory 504 and/or the storage devices 528 and processed by the processor unit(s) 502. The memory 504 may be the memory of a host device or of an accessory that couples to the host. Additionally or alternatively, the computing device 500 may comprise one or more field programmable gate arrays (FGPAs), application specific integrated circuits (ASIC), or other hardware/software/firmware capable of providing the functionality described herein.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable, and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for sharing a secret amongst a plurality of computing devices, comprising:
   distributing a share of the secret to a plurality of computing devices, wherein the secret is not reconstructable with less than the shares of an authorized set of participants that comprises a subset of the plurality of computing devices;
   receiving a request to reconstruct the secret, wherein the request comprises the shares from a participating subset of the computing devices, wherein each of the shares from the participating subset of the computing devices comprise an encoded trust structure for the corresponding computing device, and wherein no information regarding the encoded trust structure of a given participant of the participating subset is available to other participants of the participating subset;
   defining the authorized set of participants required to participate in the request for reconstruction of the secret, wherein the authorized set of participants is based on the encoded trust structures of the shares of the participating subset of the computing devices;
   determining whether the participating subset of computing devices comprises the authorized set of participants; and
   reconstructing the secret using the plurality of shares if the participating subset of the computing devices comprises the authorized set of participants.

2. The method of claim 1, wherein the encoded trust structure comprises information regarding whom the corresponding computing device deems as trustworthy.

3. The method of claim 1, wherein the encoded trust structure comprises information regarding whom the corresponding computing device deems as untrustworthy.

4. The method of claim 1, wherein the share is derived from a combinatorial object that encodes the encoded trust structure.

5. The method of claim 4, wherein the combinatorial object is used to encode $2^n$ authorized and unauthorized sets.

6. The method of claim 5, wherein the authorized and unauthorized sets are represented by a single vector inner product.

7. The method of claim 1, further comprising:
   generating the shares of the secret using a polynomial-time algorithm having as inputs a secret and the access structure.

8. A computing device executable for implementing a secret sharing scheme, comprising:
   a share generation module executable by a hardware processor of the computing device to:
      receive a secret comprising secret data, and
      generate a share of the secret, wherein the secret is not reconstructable with less than the shares of an authorized set of participants that comprises a subset of the plurality of computing devices, wherein each of the shares from the participating subset of the computing devices comprise an encoded trust structure for the corresponding computing device, and wherein no information regarding the encoded trust structure of a given participant of the participating subset is available to other participants of the participating subset, and
   a secret reconstruction module executed by a hardware processor of the computing device to:
      receive a request to reconstruct the secret, wherein the request comprises the shares from a participating subset of the computing devices;
      define the authorized set of participants required to participate in the request for reconstruction of the secret, wherein the authorized set of participants is based on the encoded trust structures of the shares of the participating subset of the computing devices;
      determine whether the participating subset of computing devices comprises the authorized set of participants; and
      reconstruct the secret using the plurality of shares if the participating subset of the computing devices comprises the authorized set of participants.

9. The computing device of claim 8, wherein the encoded trust structure comprises information regarding whom the corresponding computing device deems as trustworthy.

10. The computing device of claim 8, wherein the encoded trust structure comprises information regarding whom the corresponding commuting device deems as untrustworthy.

11. The computing device of claim 8, wherein the share is derived from a combinatorial object that encodes the encoded trust structure.

12. The computing device of claim 11, wherein the combinatorial object comprises $2^n$ authorized and unauthorized sets.

13. The method of claim 12, wherein the authorized and unauthorized sets are represented by a single vector inner product.

14. One or more tangible processor-readable storage media embodied with instructions for executing on one or more processors and circuits of a device a process for sharing a secret amongst a plurality of computing devices, comprising:
   distributing a share of the secret to a plurality of computing devices, wherein the secret is not reconstructable with less than the shares of an authorized set of participants that comprises a subset of the plurality of computing devices;
   receiving a request to reconstruct the secret, wherein the request comprises the shares from a participating subset of the computing devices, wherein each of the shares from the participating subset of the computing devices comprise an encoded trust structure for the corresponding computing device, and wherein no information regarding the encoded trust structure of a given participant of the participating subset is available to other participants of the participating subset;
   defining the authorized set of participants required to participate in the request for reconstruction of the secret, wherein the authorized set of participants is based on the encoded trust structures of the shares of the participating subset of the computing devices;

determining whether the participating subset of computing devices comprises the authorized set of participants, and reconstructing the secret using the plurality of shares if the participating subset of the computing devices comprises the authorized set of participants.

15. The one or more tangible processor-readable storage media of claim 14, wherein the share is derived from a combinatorial object that encodes the encoded trust structure.

16. The one or more tangible processor-readable storage media of claim 15, wherein the combinatorial object is used to encode $2^n$ authorized and unauthorized sets.

17. The one or more tangible processor-readable storage media of claim 16, wherein the authorized and unauthorized sets are represented by a single vector inner product.

18. The method of claim 1, wherein no information regarding the encoded trust structure of any participant of the participating subset is available if reconstruction of the secret fails.

19. The computing device of claim 8, wherein no information regarding the encoded trust structure of any participant of the participating subset is available if reconstruction of the secret fails.

20. The one or more tangible processor-readable storage media of claim 14, wherein no information regarding the encoded trust structure of any participant of the participating subset is available if reconstruction of the secret fails.

* * * * *